(12) United States Patent
Nakayama et al.

(10) Patent No.: US 11,453,194 B2
(45) Date of Patent: *Sep. 27, 2022

(54) INTERLAYER FILM FOR LAMINATED GLASS, AND LAMINATED GLASS (71) Applicant: SEKISUI CHEMICAL CO., LTD., Osaka (JP)

(72) Inventors: Kazuhiko Nakayama, Shiga (JP); Hiroaki Inui, Roermond (NL); Hirofumi Kitano, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 275 days.

This patent is subject to a terminal disclaimer.

(21) Appl. No.: 15/500,980

(22) PCT Filed: Oct. 13, 2015

(86) PCT No.: PCT/JP2015/078881
§ 371 (c)(1),
(2) Date: Feb. 1, 2017

(87) PCT Pub. No.: WO2016/056668
PCT Pub. Date: Apr. 14, 2016

(65) Prior Publication Data
US 2017/0217122 A1 Aug. 3, 2017

(30) Foreign Application Priority Data
Oct. 10, 2014 (JP) .............................. JP2014-209177

(51) Int. Cl.
*B32B 3/30* (2006.01)
*B32B 17/06* (2006.01)
(Continued)

(52) U.S. Cl.
CPC .................. *B32B 3/30* (2013.01); *B32B 17/06* (2013.01); *B32B 17/10036* (2013.01);
(Continued)

(58) Field of Classification Search
CPC ......... B32B 27/06; B32B 17/06; B32B 17/10; B32B 3207/538; B32B 3/30
See application file for complete search history.

(56) References Cited

U.S. PATENT DOCUMENTS 4,946,747 A * 8/1990 Bergmann .............. C23C 14/16
428/653
6,093,471 A * 7/2000 Hopfe ............... B32B 17/10577
428/141
(Continued)

FOREIGN PATENT DOCUMENTS

BY 8073 6/2006
CA 2 388 107 5/2001
(Continued)

OTHER PUBLICATIONS

Extended European Search Report dated Apr. 18, 2018 in European Application No. 15849189.4.
(Continued)

*Primary Examiner* — Laura A Auer
(74) *Attorney, Agent, or Firm* — Wenderoth, Lind & Ponack, L.L.P.

(57) ABSTRACT

The present invention aims to provide an interlayer film for a laminated glass capable of exhibiting high deaeration properties in a vacuum deaeration method and enabling production of a highly transparent laminated glass, and a laminated glass including the interlayer film for a laminated glass. The present invention relates to an interlayer film for a laminated glass, having a large number of recesses on at least one surface, the recesses each having a groove shape
(Continued)

with a continuous bottom and being regularly adjacent and parallel to each other, the recesses each having a radius of rotation R of a bottom of the groove shape with a continuous bottom of 45 μm or less.

10 Claims, 2 Drawing Sheets

(51) Int. Cl.
  *B32B 17/10* (2006.01)
  *B32B 27/06* (2006.01)
(52) U.S. Cl.
  CPC .. *B32B 17/10587* (2013.01); *B32B 17/10688* (2013.01); *B32B 17/10761* (2013.01); *B32B 17/10972* (2013.01); *B32B 27/06* (2013.01); *B32B 2307/538* (2013.01)

(56) References Cited

U.S. PATENT DOCUMENTS

| | | | |
|---|---|---|---|
| 7,678,441 B2 | 3/2010 | Smith | |
| 2004/0191482 A1 | 9/2004 | Nakajima et al. | |
| 2007/0003746 A1* | 1/2007 | Chen | B32B 17/10 428/220 |
| 2007/0178314 A1* | 8/2007 | Marumoto | B32B 17/10036 428/426 |
| 2009/0324889 A1* | 12/2009 | Stenzel | B32B 3/30 428/167 |
| 2010/0177380 A1* | 7/2010 | Nagahama | G02B 5/0231 359/359 |

FOREIGN PATENT DOCUMENTS

| | | | |
|---|---|---|---|
| EP | 1 233 007 | 6/2008 | |
| EP | 3 130 569 | 2/2017 | |
| EP | 3 202 729 | 8/2017 | |
| EP | 3 202 738 | 8/2017 | |
| JP | 60-204643 | 10/1985 | |
| JP | 60-208241 | 10/1985 | |
| JP | 9-295839 | 11/1997 | |
| JP | 09295839 A * | 11/1997 | ....... B32B 17/10587 |
| JP | 2001-48599 | 2/2001 | |
| JP | 2001048599 A * | 2/2001 | |
| JP | 2001-163640 | 6/2001 | |
| JP | 2002-37648 | 2/2002 | |
| JP | 2002037648 A * | 2/2002 | |
| JP | 2002-104846 | 4/2002 | |
| JP | 2002104846 A * | 4/2002 | ....... B32B 17/10587 |
| JP | 2008-31013 | 2/2008 | |
| JP | 2009-190947 | 8/2009 | |
| TW | 201350321 | 12/2013 | |

OTHER PUBLICATIONS

Database WPI Week 200258, Apr. 10, 2002 (Apr. 10, 2002) Thomson Scientific, London GB; AN 2002-541264, XP002779824, 3 pages.
Database WPI Week 201422, Dec. 16, 2013 (Dec. 16, 2013) Thomson Scientific, London, GB; AN 2014-E45041, XP002779825, 1 page.
International Search Report dated Jan. 19, 2016 in corresponding International (PCT) Application No. PCT/JP2015/078881.
Extended European Search Report dated Feb. 21, 2020 in corresponding European Patent Application No. 19216606.4.
Communication pursuant to Article 94(3) EPC dated Mar. 18, 2021 in corresponding European Patent Application No. 19 216 606.4.

* cited by examiner

INTERLAYER FILM FOR LAMINATED GLASS, AND LAMINATED GLASS

TECHNICAL FIELD

The present invention relates to an interlayer film for a laminated glass capable of exhibiting high deaeration properties in a vacuum deaeration method and enabling production of a highly transparent laminated glass, and a laminated glass including the interlayer film for a laminated glass.

BACKGROUND ART

A laminated glass including two glass plates integrated through an interlayer film for a laminated glass containing a thermoplastic resin such as plasticized polyvinyl butyral is widely used for automotive windshields.

Such an automotive windshield is, for example, produced by a vacuum deaeration method.

In the vacuum deaeration method, an interlayer film for a laminated glass is sandwiched between at least two glass plates to give a laminate. The laminate is placed in a rubber bag and vacuum suctioned for removal of air remaining between the glass plates and the interlayer film so as to be preliminarily pressure bonded. Then, the laminate is pressurized with heat, for example, in an autoclave for final pressure bonding to provide an automotive windshield.

In the process for producing a laminated glass by the vacuum deaeration method, deaeration properties upon stacking a glass plate and an interlayer film for a laminated glass on top of each other is important. The interlayer film for a laminated glass therefore commonly has minute projections and recesses formed on at least one surface for the purpose of ensuring the deaeration properties in production of a laminated glass. In particular, when the recesses, among the projections and recesses, each have a groove shape with a continuous bottom and such recesses in the shape of engraved lines are regularly formed side by side in parallel with one another, excellent deaeration properties can be exhibited (see, Patent Literature 1).

However, even in the production of a laminated glass by the vacuum deaeration method using such an interlayer film for a laminated glass having recesses each having a continuous groove shape on a surface, deaeration properties may be insufficient and foaming due to air remaining in the interlayer film is caused, leading to lower transparency of the resulting laminated glass.

CITATION LIST

Patent Literature

Patent Literature 1: JP 2001-48599 A

SUMMARY OF INVENTION

Technical Problem

The present invention aims to provide an interlayer film for a laminated glass capable of exhibiting high deaeration properties in a vacuum deaeration method and enabling production of a highly transparent laminated glass, and a laminated glass including the interlayer film for a laminated glass. The interlayer film for a laminated glass of the present invention may be used in a method other than the vacuum deaeration method.

Solution to Problem

The present invention relates to an interlayer film for a laminated glass, having a large number of recesses on at least one surface, the recesses each having a groove shape with a continuous bottom and being regularly adjacent and parallel to each other, the recesses each having a radius of rotation R of a bottom of the groove shape with a continuous bottom of 45 μm or less.

The present invention is specifically described in the following.

The present inventors investigated why the transparency of a laminated glass produced by a vacuum deaeration method is poor.

In preliminary pressure bonding in the vacuum deaeration method, a laminate including an interlayer film for a laminated glass interposed between at least two glass plates is placed in a rubber bag and vacuum suctioned for removal of air remaining between the glass plates and the interlayer film, and the interlayer film for a laminated glass and the glass plates at end portions of the laminate are closely bonded to each other with heat for sealing. Due to such sealing, the inside of the laminate is maintained as a vacuum even after the laminate is taken out from the rubber bag, thereby preventing air intrusion before the final pressure bonding. In actual production, deaeration and heating are carried out at the same time for shortening the production time.

As a result of intensive studies, the present inventors found out the following. If unintended sealing (hereafter, also referred to as "preceding sealing") of the interlayer film for a laminated glass and the glass plates occurs at end portions of a laminate before completion of sufficient deaeration during preliminary pressure bonding in which deaeration and heating are carried out at the same time, insufficient deaeration is caused to problematically allow much air to remain inside the laminate. In the laminate in which preceding sealing occurs, residual air causes foaming after autoclaving during final pressure bonding, leading to lowered transparency of the resulting laminated glass.

One considered means to prevent preceding sealing is to increase the roughness of the groove shape with a continuous bottom so that the groove shape is not easily deformed, thereby extending the time for sealing. In the cases where the roughness is increased, however, the groove shape with a continuous bottom is not sufficiently deformed even after pressure bonding, resulting in insufficient deaeration.

The present inventors made further intensive studies to find out that an interlayer film for a laminated glass in which the radius of rotation R of the bottom of a recess having a groove shape with a continuous bottom is set to 45 μm or less can exhibit high deaeration properties in a vacuum deaeration method and enable production of a highly transparent laminated glass. The present invention was thus completed.

The interlayer film for a laminated glass of the present invention may also be used in a method other than the vacuum deaeration method.

The interlayer film for a laminated glass of the present invention has a large number of recesses on at least one surface, and the recesses each have a groove shape with a continuous bottom and are regularly adjacent and parallel to each other. With this structure, deaeration properties during production of a laminated glass by a vacuum deaeration method can be ensured. The recesses may be formed only on one surface. Preferably, the recesses are formed on both surfaces of the interlayer film for a laminated glass because deaeration properties are markedly improved.

The interlayer film for a laminated glass of the present invention has recesses each having a groove shape with a continuous bottom on the at least one surface (namely, having "recesses in the shape of engraved lines"), and adjacent recesses are regularly parallel to each other. Commonly, ease of deaeration upon pressure bonding of a laminate including an interlayer film for a laminated glass interposed between two glass plates closely relates to the communication properties and smoothness of the bottoms of the recesses. When the pattern of recesses on at least one surface of the interlayer film is a pattern in which recesses in the shape of engraved lines are regularly adjacent and parallel to each other, the communication properties of the recesses are further improved to markedly increase the deaeration properties. In addition, the recesses in the shape of engraved lines each do not necessarily have a groove shape with a completely continuous bottom, and may have a partition wall in a part of the bottom. The grooves at the bottom do not necessarily have a straight line shape and may be in the shape of, for example, a wave or zigzag, as long as the recesses are regularly adjacent and parallel to each other.

Figure 1:
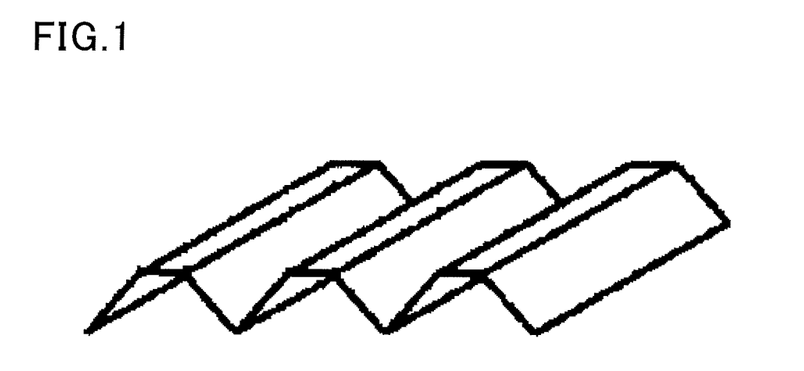
FIG. 1 is a view schematically illustrating an exemplary interlayer film for a laminated glass in which recesses each having a groove shape with a continuous bottom are adjacent and parallel to each other at equal intervals on a surface.
Figure 2:
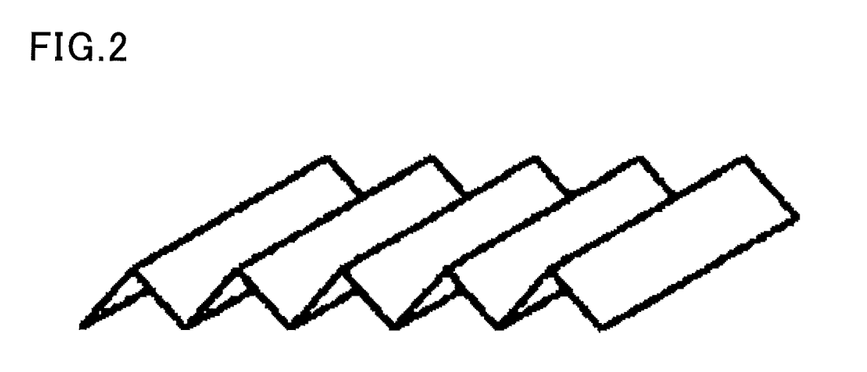
FIG. 2 is a view schematically illustrating an exemplary interlayer film for a laminated glass in which recesses each having a groove shape with a continuous bottom are adjacent and parallel to each other at equal intervals on a surface.

FIGS. 1 and 2 each are a view schematically illustrating an exemplary interlayer film for a laminated glass in which recesses in the shape of engraved lines are adjacent and parallel to each other at equal intervals.

Figure 3:
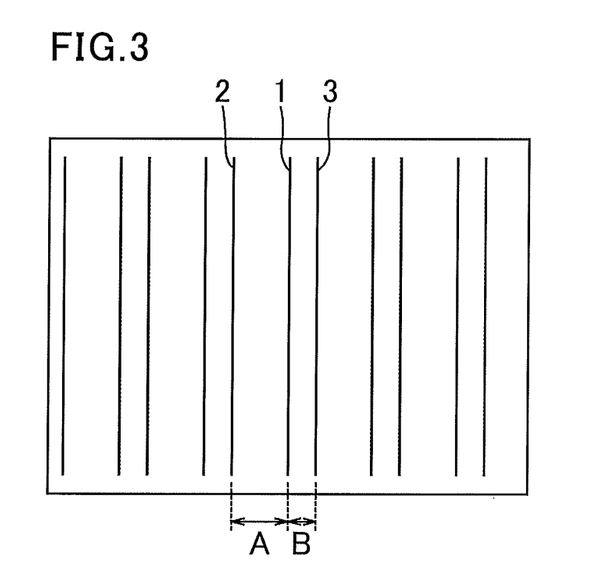
FIG. 3 is a view schematically illustrating an exemplary interlayer film for a laminated glass in which recesses each having a groove shape with a continuous bottom are adjacent and parallel to each other not at equal intervals.

FIG. 3 is a view schematically illustrating an exemplary interlayer film for a laminated glass in which recesses in the shape of engraved lines are adjacent and parallel to each other not at equal intervals. In FIG. 3, an interval A between a recess 1 and a recess 2 and an interval B between the recess 1 and a recess 3 are different.

In the interlayer film for a laminated glass of the present invention, the radius of rotation R of the bottom of the recess having a groove shape with a continuous bottom is 45 µm or less. With this structure, preceding sealing can be prevented, and the interlayer film for a laminated glass can exhibit high deaeration properties in a vacuum deaeration method to enable production of a highly transparent laminated glass. Presumably, when the radius of rotation R of the bottom of the recess having a groove shape with a continuous bottom is smaller than that of a conventional interlayer film for a laminated glass, the time for sealing of the interlayer film for a laminated glass and the glass plates at end portions of the laminate can be delayed until sufficient deaeration is completed in the preliminary pressure bonding in which deaeration and heating are carried out at the same time, with no need for increasing the roughness of the groove shape with a continuous bottom. The radius of rotation R of the bottom of the recess having a groove shape with a continuous bottom is preferably 40 µm or less, more preferably 30 µm or less, still more preferably 15 µm or less, particularly preferably 10 µm or less. The lower limit of the radius of rotation R of the bottom of the recess having a groove shape with a continuous bottom is not particularly limited, and is practically 0.001 µm. The radius of rotation R of the bottom of the recess having a groove shape with a continuous bottom is preferably 0.1 µm or more, more preferably 1 µm or more. When the radius of rotation R of the bottom is equal to or larger than the above value, sealing before complete crush of the recesses during the preliminary pressure bonding can be prevented.

In a case where the interlayer film for a laminated glass of the present invention has a large number of recesses on both surfaces and the recesses each have a groove shape with a continuous bottom and are regularly adjacent and parallel to each other, the recesses each having a groove shape with a continuous bottom on either surface should have a radius of rotation R of the bottom of 45 µm or less.

Preferably, the interlayer film for a laminated glass of the present invention has a large number of recesses on one surface and the other surface opposite to the one surface, and the recesses each have a groove shape with a continuous bottom. The presence of the recesses on both surfaces markedly improves the deaeration properties.

In addition, the intersection angle θ between the recesses each having a groove shape with a continuous bottom on the one surface and the recesses each having a groove shape with a continuous bottom on the other surface is preferably more than 0°, more preferably 20° or more, most preferably 90° because air can be discharged in various directions, leading to smooth deaeration. The intersection angle θ refers to the acute angle of the angles formed between the recesses each having a groove shape with a continuous bottom on the one surface and the recesses each having a groove shape with a continuous bottom on the surface opposite to the one surface.

The radius of rotation R of the bottom of the recess having a groove shape with a continuous bottom as used herein is measured as follows. The interlayer film for a laminated glass is cut with a single-edged razor (e.g., FAS-10 produced by FEATHER Safety Razor Co., Ltd.) in a direction perpendicular to the direction of the groove shape with a continuous bottom of the recess and in parallel with the thickness direction of the film in such a manner that the cut plane is not deformed. Specifically, the razor is not slid in the direction perpendicular to the recesses but pushed out in a direction parallel to the thickness direction. The cross section is observed using a microscope (e.g., "DSX-100" produced by Olympus Corporation) and photographed at a magnification of 277 times. The obtained image is enlarged to 50 µm/20 mm for analysis using measurement software included in accessory software. The radius of an inscribed circle at the bottom of the recess having a groove shape with a continuous bottom is determined as the radius of rotation R of the recess. The measurement is performed at 23° C. and 30 RH %. Five samples are taken at arbitrary five points in the interlayer film for a laminated glass and the radius of rotation is measured at three sites in each sample. The R is the average of the values measured at 15 sites in total.

Figure 4:
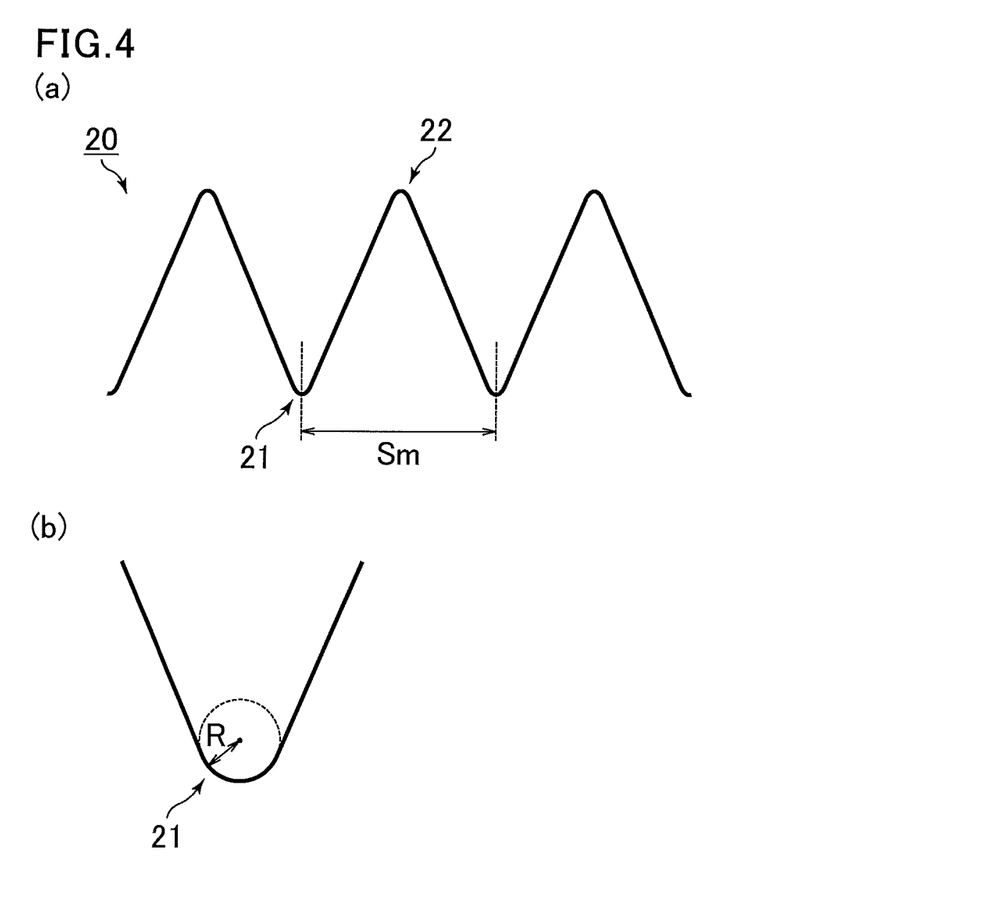
FIG. 4 is a view schematically explaining a radius of rotation R of a bottom of a recess having a groove shape with a continuous bottom and an interval Sm between recesses.

FIG. 4 is a view schematically explaining the radius of rotation R of the bottom of a recess having a groove shape with a continuous bottom and an interval Sm between recesses. In FIG. 4 (a), a surface 20 of an interlayer film for a laminated glass has recesses 21 each having a groove shape with a continuous bottom. The Sm means an interval between the recesses 21. In FIG. 4(b), R represents a radius of a circle inscribed at the bottom of the recess 21.

In the interlayer film for a laminated glass of the present invention, a highest point determined from a roughness curve drawn in conformity with JIS B 0601 (1994) in a direction of a line representing the shortest distance between deepest bottoms of adjacent recesses each having a groove shape with a continuous bottom is preferably not at the center of the line representing the shortest distance between the deepest bottoms.

Figure 5:
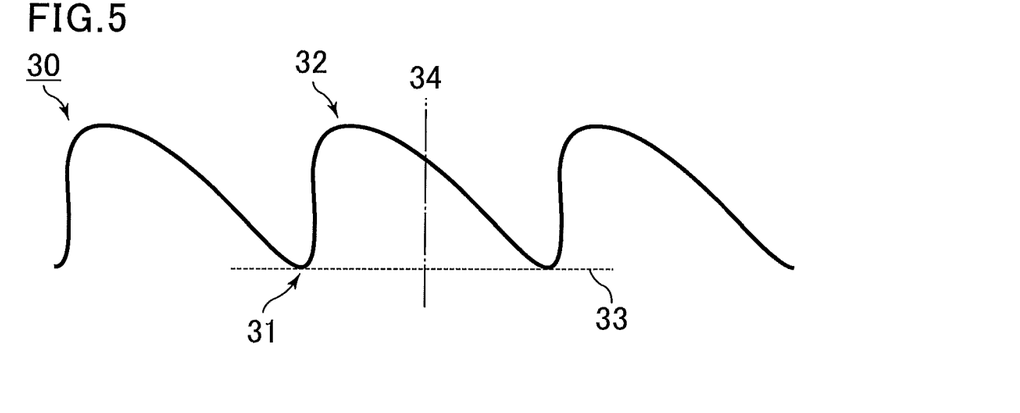
FIG. 5 is a view schematically illustrating an interlayer film for a laminated glass in which the highest point determined from a roughness curve drawn in conformity with JIS B 0601 (1994) in a direction of a line representing the shortest distance between deepest bottoms of adjacent recesses each having a groove shape with a continuous bottom is not at the center of the line representing the shortest distance between the deepest bottom.

FIG. 5 is a view schematically illustrating an interlayer film for a laminated glass in which the highest point determined from a roughness curve drawn in conformity with JIS B 0601 (1994) in a direction of a line representing the shortest distance between deepest bottoms of adjacent recesses each having a groove shape with a continuous bottom is not at the center of the line representing the shortest distance between the deepest bottoms. As illustrated in FIG. 5, a state where the highest point is not at the center of the line representing the shortest distance between the deepest bottoms refers to a state where the shape of adjacent recesses each having a groove shape with a continuous bottom is asymmetric to a line perpendicularly crossing the center of the line representing the shortest distance between the deepest bottoms of the adjacent recesses each having a groove shape with a continuous bottom. When the shape of the adjacent recesses each having a groove shape with a continuous bottom is asymmetric, the radius of rotation R of the bottom of the recess having a groove shape with a continuous bottom can be easily set to 45 µm or less.

In the interlayer film for a laminated glass of the present invention, an interval Sm between the recesses each having a groove shape with a continuous bottom is preferably 400 µm or less. With this structure, more excellent deaeration properties can be exhibited upon preliminary pressure bonding in production of a laminated glass by a vacuum deaeration method, and the recesses each having a groove shape with a continuous bottom are more easily crushed by the pressure of the vacuum deaeration. The interval Sm between the recesses each having a groove shape with a continuous bottom is more preferably 300 µm or less.

The lower limit of the interval Sm between the recesses each having a groove shape with a continuous bottom is preferably 100 µm, more preferably 150 µm.

The interval Sm between the recesses each having a groove shape with a continuous bottom as used herein is defined by JIS B 0601 (1994). The measurement may be performed at a standard length of 2.5 mm, an evaluation length of 12.5 mm, and a measurement rate of 0.5 mm/s, with a stylus having a tip radius of 2 µm and a tip angle of 60°. The measurement is performed at arbitrarily selected 5 sites, and the average of the measured values is taken as the Sm.

In the interlayer film for a laminated glass of the present invention, the roughness Rz of the recesses each having a groove shape with a continuous bottom is preferably 60 µm or less. With this structure, more excellent deaeration properties can be exhibited upon preliminary pressure bonding in production of a laminated glass by a vacuum deaeration method, and the recesses each having a groove shape with a continuous bottom are more easily crushed by the pressure of the vacuum deaeration. The roughness Rz of the recesses each having a groove shape with a continuous bottom is more preferably 50 µm or less.

The lower limit of the roughness Rz of the recesses each having a groove shape with a continuous bottom is preferably 10 µm, more preferably 20 µm.

The roughness Rz of the recesses each having a groove shape with a continuous bottom as used herein is defined by JIS B 0601(1994).

Preferably, in the interlayer film for a laminated glass of the present invention, the surface having a large number of recesses further has a large number of projections, and the projections each have a non-planar apex. With this structure, more excellent deaeration properties can be exhibited upon preliminary pressure bonding.

The interlayer film for a laminated glass of the present invention may have a single layer structure consisting of one resin film or a multilayer structure including two or more resin layers laminated together.

In the case of having a multilayer structure, the interlayer film for a laminated glass of the present invention may include, as two or more resin layers mentioned above, a first resin layer and a second resin layer having different characteristics. Such an interlayer film for a laminated glass can have various properties which are hardly achieved by a single layer structure.

The resin layer preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the thermoplastic resin preferably contains polyvinyl acetal or an ethylene-vinyl acetate copolymer, more preferably contains polyvinyl acetal.

The polyvinyl acetal can be prepared, for example, by acetalization of polyvinyl alcohol (PVA) with an aldehyde. The polyvinyl acetal is preferably an acetalization product of polyvinyl alcohol. The PVA commonly has a degree of saponification within a range of 70 to 99.9 mol %.

PVA to be used for preparing the polyvinyl acetal has a degree of polymerization of preferably 200 or more, more preferably 500 or more, still more preferably 1700 or more, particularly preferably 2000 or more, and preferably 5000 or less, more preferably 4000 or less, still more preferably 3000 or less, furthermore preferably less than 3000, particularly preferably 2800 or less. The polyvinyl acetal is preferably a polyvinyl acetal prepared by acetalization of PVA having a degree of polymerization that satisfies the above lower limit and upper limit. When the degree of polymerization is equal to or more than the lower limit, a laminated glass to be obtained has higher penetration resistance. When the degree of polymerization is equal to or lower than the upper limit, formation of an interlayer film is facilitated.

The degree of polymerization of PVA refers to the average degree of polymerization. The average degree of polymerization can be obtained by the method in conformity with JIS K6726 "Testing methods for polyvinyl alcohol". Commonly, the aldehyde is preferably a C1-C10 aldehyde. Examples of the C1-C10 aldehyde include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The polyvinyl acetal is preferably polyvinyl butyral. The use of polyvinyl butyral further increases the weather resistance or the like of an interlayer film for a laminated glass and a laminated glass to be obtained.

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the organic plasticizer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The resin layer to be in contact with a glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The interlayer film for a laminated glass of the present invention preferably contains at least one metal selected from the group consisting of alkali metals, alkaline earth metals, and magnesium. When the interlayer film for a laminated glass contains at least one metal selected from the group consisting of alkali metals, alkaline earth metals, and magnesium, the adhesion force to the glass plate can be adjusted, so that a laminated glass to be obtained can have high penetration resistance.

The lower limit of the amount of the at least one metal selected from the group consisting of alkali metals, alkaline earth metals, and magnesium is preferably 1 ppm, more preferably 5 ppm, still more preferably 20 ppm, particularly preferably 50 ppm from the viewpoint of further improving the penetration resistance of the laminated glass. The upper limit of the amount of the at least one metal selected from the group consisting of alkali metals, alkaline earth metals, and magnesium is preferably 500 ppm, more preferably 300 ppm, still more preferably 150 ppm, particularly preferably 100 ppm, because the adhesion force between the interlayer film for a laminated glass and the glass plate can be controlled to prevent peeling so that defective sealing upon preliminary pressure bonding is further prevented.

Preferably, the interlayer film for a laminated glass of the present invention includes, as two or more resin layers mentioned above, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is smaller than the content B, the first resin layer tends to have a higher glass transition temperature than the second resin layer. As a result, the first resin layer is harder than the second resin layer, leading to higher penetration resistance of the interlayer film for a laminated glass.

In the case of having a laminated structure including three or more layers, the interlayer film for a laminated glass of the present invention preferably has a laminated structure including a first resin layer, a second resin layer, and a third resin layer stacked in said order in the thickness direction. From the standpoint of imparting various functions such as high impact resistance, the first resin layer and the third resin layer preferably have different thicknesses. The thickness of the first resin layer and the thickness of the third resin layer is different preferably by 10 μm or more, more preferably by 50 μm or more, still more preferably by 100 μm or more. The upper limit of the difference in the thickness between the first resin layer and the third resin layer is not particularly limited, and is practically 1000 μm.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains the polyvinyl acetal X and a plasticizer, and the protective layer contains the polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. From the standpoint of imparting various functions such as high impact resistance, when two or more protective layers are included, the thickness of each protective layer is preferably different from each other. The sound insulation interlayer film is more specifically described in the following.

In the sound insulation interlayer film, the sound insulation layer imparts sound insulation properties. The sound insulation layer preferably contains the polyvinyl acetal X and a plasticizer.

The polyvinyl acetal X can be prepared by acetalization of polyvinyl alcohol with an aldehyde. The polyvinyl alcohol is commonly obtained by saponifying polyvinyl acetate.

The lower limit of the degree of polymerization of the polyvinyl alcohol is preferably 200, and the upper limit thereof is preferably 5000. When the polyvinyl alcohol has an average degree of polymerization of 200 or more, a sound insulation interlayer film to be obtained can have better penetration resistance. When the polyvinyl alcohol has an average degree of polymerization of 5000 or less, formability of a sound insulation layer can be ensured. Concerning the average degree of polymerization of the polyvinyl alcohol, the lower limit is more preferably 500 and the upper limit is more preferably 4000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, a sound insulation interlayer film for a laminated glass to be obtained can stably contain a sufficient amount of a plasticizer. As a result, the sound insulation interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 100 parts by mass. When the plasticizer content is 45 parts by mass or more, the sound insulation layer can exhibit high sound insulation properties. When the plasticizer content is 100 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 80 parts by mass, still more preferably 75 parts by mass, particularly preferably 70 parts by mass.

The plasticizer content of the sound insulation layer may be the plasticizer content before the production of a laminated glass or the plasticizer content after the production of a laminated glass.

The plasticizer content after the production of a laminated glass can be measured by the following procedure. A produced laminated glass is allowed to stand at a temperature of 25° C. and a humidity of 30% for 4 weeks. Then, the laminated glass is cooled in liquid nitrogen to separate the glass plate from the interlayer film for a laminated glass. The resulting interlayer film for a laminated glass is cut in the thickness direction, and allowed to stand at a temperature of 25° C. and a humidity of 30% for 2 hours. The protective layer is peeled from the sound insulation layer using a finger or a device inserted between the protective layer and the sound insulation layer at a temperature of 25° C. and a humidity of 30%, thereby preparing 10 g of a rectangular sample for measurement of the sound insulation layer. The plasticizer in the sample for measurement is extracted in diethyl ether using a Soxhlet extractor for 12 hours, and the amount of the plasticizer in the sample for measurement is determined, thereby obtaining the plasticizer content of the sound insulation layer.

The lower limit of the thickness of the sound insulation layer is preferably 50 μm. Having a thickness of 50 μm or more, the sound insulation layer can exhibit enough sound insulation properties. The lower limit of the thickness of the sound insulation layer is more preferably 80 μm. The upper limit thereof is not particularly limited. In consideration of the thickness as an interlayer film for a laminated glass, the upper limit is preferably 300 μm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a larger hydroxy group content than the polyvinyl acetal. X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5000. When the polyvinyl alcohol has an average degree of polymerization of 200 or more, an interlayer film for a laminated glass to be obtained can have better penetration resistance. When the polyvinyl alcohol has an average degree of polymerization of 5000 or less, formability of a protective layer can be ensured. Concerning the average degree of polymerization of the polyvinyl alcohol, the lower limit is more preferably 500 and the upper limit is more preferably 4000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or less, whitening of an interlayer film for a laminated glass to be obtained can be prevented. When the polyvinyl acetal Y has a hydroxy group content of 28 mol % or more, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of the polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably smaller than the plasticizer content of the sound insulation layer.

The plasticizer content of the protective layer may be the plasticizer content before the production of a laminated glass or the plasticizer content after the production of a laminated glass. The plasticizer content after the production of a laminated glass may be measured by the same procedure as that for the sound insulation layer.

For higher sound insulation properties of a laminated glass to be obtained, the hydroxy group content of the polyvinyl acetal Y is preferably larger than the hydroxy group content of the polyvinyl acetal X, more preferably larger by 1 mol % or more, still more preferably larger by 5 mol % or more, particularly preferably larger by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content (hereafter, also referred to as content X) based on 100 parts by mass of the polyvinyl acetal X of the sound insulation layer is preferably larger than the plasticizer content (hereafter, also referred to as content Y) based on 100 parts by mass of the polyvinyl acetal Y of the protective layer, more preferably larger by 5 parts by mass or more, still more preferably larger by 15 parts by mass or more, particularly preferably larger by 20 parts by mass or more. Adjustment of the content X and content Y lowers the glass transition temperature of the sound insulation layer. As a result, a laminated glass to be obtained has still higher sound insulation properties.

The protective layer may have any thickness, provided that it can fulfill the role as the protective layer. In a case where projections and recesses are formed on the protective layer, the protective layer is preferably as thick as possible to prevent the projections and recesses from being transferred to the interface with the sound insulation layer directly in contact with the protective layer. Specifically, the lower limit of the protective layer is preferably 100 μm, more preferably 300 μm, still more preferably 400 μm, particularly preferably 450 μm. The upper limit of the thickness of the protective layer is not particularly limited. In order to ensure the thickness enough to achieve sufficient sound insulation properties, the upper limit of the protective layer is practically about 500 μm.

The sound insulation interlayer film may be produced by any method. The sound insulation interlayer film can be produced, for example, by a method of forming the sound insulation layer and protective layer as sheet materials by a conventional film formation method such as extrusion, calendering, or pressing and then stacking the obtained sheet materials.

The interlayer film for a laminated glass of the present invention may be produced by any method, and a conventionally known method may be employed.

In the present invention, a large number of recesses may be formed on at least one surface of the interlayer film for a laminated glass by, for example, an embossing roll method, calendar roll method, profile extrusion method, or extrusion lip embossing method which takes advantage of melt fracture. In particular, preferred is the embossing roll method because the structure where the recesses each having a groove shape with a continuous bottom are regularly adjacent and parallel to each other is easily achieved.

Exemplary embossing rolls used in the embossing roll method include an embossing roll having an emboss pattern (pattern of projections and recesses) on the roll surface which is prepared by blasting a metal roll surface with an abrasive material such as aluminum oxide or silicon oxide and lapping the surface through vertical grinding or the like for the purpose of reducing excessive peaks. Other examples include an embossing roll having an emboss pattern (pattern of projections and recesses) on the roll surface which is prepared by transferring the emboss pattern (pattern of projections and recesses) to a metal roll surface with an engraving mill. Other examples further include an embossing roll having an emboss pattern (pattern of projections and recesses) formed by etching on the roll surface.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Other examples of the glass plates include organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

The laminated glass of the present invention is favorably produced by a vacuum deaeration method.

In the vacuum deaeration method, a laminate including at least two glass plates and the interlayer film for a laminated glass interposed therebetween is placed in a rubber bag and vacuum suctioned for removal of air remaining between the glass plates and the interlayer film so as to be preliminarily pressure bonded. Then, the laminate is pressurized with heat, for example, in an autoclave for final pressure bonding. When deaeration and heating are carried out at the same time in the preliminary pressure bonding, the production time is significantly reduced, improving the production efficiency. The use of the interlayer film for a laminated glass of the present invention can prevent preceding sealing even when deaeration and heating are carried out at the same time in the preliminary pressure bonding. Moreover, the interlayer film for a laminated glass of the present invention can exhibit high deaeration properties, resulting in production of a highly transparent laminated glass.

Advantageous Effects of Invention

The present invention can provide an interlayer film for a laminated glass capable of exhibiting high deaeration properties in a vacuum deaeration method and enabling production of a highly transparent laminated glass, and a laminated glass including the interlayer film for a laminated glass.

DESCRIPTION OF EMBODIMENTS

Embodiments of the present invention are more specifically described in the following with reference to, but not limited to, examples.

Example 1

(1) Preparation of a Resin Composition

Polyvinyl alcohol having an average degree of polymerization of 1700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral was added 40 parts by mass of triethylene glycol-di-2-ethylhexanoate (3GO) as a plasticizer, and kneaded well with a mixing roll to give a resin composition.

(2) Production of an Interlayer Film for a Laminated Glass

The obtained resin composition was extruded to provide an interlayer film for a laminated glass having a thickness of 760 μm.

(3) Formation of Projections and Recesses

In the first step, a random pattern of projections and recesses was transferred to both surfaces of the interlayer film for a laminated glass by the following procedure. A pair of rolls in the same shape having a coarse main emboss pattern and a fine sub-emboss pattern was prepared by forming random projections and recesses on the surfaces of iron rolls with an abrasive material, performing vertical grinding thereon, and further forming finer projections and recesses on planar portions after the grinding with a finer abrasive material. Using the pair of rolls as a device for transferring a pattern of projections and recesses, a random pattern of projections and recesses was transferred to both surfaces of the obtained interlayer film for a laminated glass. The transferring conditions employed here were a temperature of the interlayer film for a laminated glass of 80° C., a temperature of the rolls of 145° C., a linear velocity of 10 m/min, a line width of 1.5 m, and a pressure of 0 to 200 kN/m.

In the second step, projections and recesses in a pattern of grooves each with a continuous bottom (shape of engraved lines) were formed by the following procedure. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass having a random pattern of projections and recesses transferred in the first step was passed through the device for transferring a pattern of projections and recesses, thereby forming projections and recesses in which recesses each having a groove shape with a continuous bottom (shape of an engraved line) were adjacent and parallel to each other at equal intervals on a first surface. The transferring conditions employed here were a temperature of the interlayer film for a laminated glass of an ambient temperature, a temperature of the rolls of 140° C., a linear velocity of 10 m/min, and a pressure of 500 kPa.

Then, the same operations were performed on a second surface of the interlayer film for a laminated glass to form recesses each having a groove shape with a continuous bottom (shape of an engraved line).

(4) Analysis of Projections and Recesses on First Surface and Second Surface

The interval Sm and the roughness Rz of the recesses each having a groove shape with a continuous bottom on the first surface and the second surface of the obtained interlayer film for a laminated glass were measured by methods in conformity with JIS B 0601 (1994). The measurement was performed in a direction perpendicular to the groove shape with a continuous bottom at a cut-off value of 2.5 mm, a standard length of 2.5 mm, an evaluation length of 12.5 mm, and a measurement rate of 0.5 mm/s, with a stylus having a tip radius of 2 µm and a tip angle of 60°. Since the shape of the surface of the interlayer film for a laminated glass varies, the measurement was performed at five sites in the plane, and the average thereof was taken as the evaluation result.

The interlayer film for a laminated glass was cut with a single-edged razor (FAS-10 produced by FEATHER Safety Razor Co., Ltd.) in a direction perpendicular to the grooves each with a continuous bottom and in parallel with the thickness direction of the film in such a manner that the cut plane was not deformed. Specifically, the razor was not slid in the direction perpendicular to the recesses but pushed out in a direction parallel to the thickness direction. The cross section was observed using a microscope (e.g., "DSX-100" produced by Olympus Corporation). The cross section was photographed at a magnification of 277 times. The obtained image was enlarged to 50 µm/20 mm for analysis using the measurement software included in accessory software, and the radius of a circle inscribed at the bottom of the groove with a continuous bottom (i.e., radius of rotation R) was obtained. The measurement was performed at 23° C. and 30 RH %.

(5) Production of a Laminate

The obtained interlayer film for a laminated glass was sandwiched between two clear glass plates (30 cm in length× 30 cm in width×2.5 mm in thickness) and the portions of the film protruding from the glass plates were cut off, thereby preparing a laminate. The resulting laminate was preliminarily heated until the glass surface temperature reached 50° C. in an oven, and transferred into a rubber bag, which was then connected to a vacuum suction device. The rubber bag was heated so that the temperature of the laminate (preliminary pressure bonding temperature) reached 90° C., while being held under a reduced pressure of −600 mmHg for 10 minutes. Thereafter, the pressure was returned to atmospheric pressure, whereby the preliminary pressure bonding was completed.

Examples 2 to 5, Comparative Examples 1 to 6

An interlayer film for a laminated glass and a laminate were produced as in Example 1, except that the acetyl group content, butyral group content, and hydroxy group content of the polyvinyl butyral used and the amount of the plasticizer were changed as shown in Table 1 and that the radius of rotation R, the interval Sm, and the roughness Rz of the recesses each having a groove shape with a continuous bottom on the first surface and the second surface were changed as shown in Table 1 by changing the shape of the metal roll having a surface milled with a triangular oblique line-type mill.

Example 6

(1) Preparation of a Resin Composition

Polyvinyl alcohol having an average degree of polymerization of 1700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral were added 40 parts by mass of triethylene glycol-di-2-ethylexanoate (3GO) as a plasticizer and a mixture (mass ratio of 1:1) of magnesium 2-ethylbutyrate and magnesium acetate as an adhesion modifier in such an amount that the magnesium content of the resulting interlayer film for a laminated glass became 50 ppm. The mixture was kneaded well with a mixing roll to give a resin composition.

(2) Production of an Interlayer Film for a Laminated Glass

The obtained resin composition was extruded to form an interlayer film for a laminated glass having a thickness of 760 µm.

(3) Formation of Projections and Recesses

In the first step, a random pattern of projections and recesses was transferred to both surfaces of the interlayer film for a laminated glass by the following procedure. A pair of rolls in the same shape having a coarse main emboss pattern and a fine sub-emboss pattern was prepared by forming random projections and recesses on the surfaces of iron rolls with an abrasive material, performing vertical grinding thereon, and further forming finer projections and recesses on planar portions after the grinding with a finer abrasive material. Using the pair of rolls as a device for transferring a pattern of projections and recesses, a random pattern of projections and recesses was transferred to both surfaces of the obtained interlayer film for a laminated glass. The transferring conditions employed here were a temperature of the interlayer film for a laminated glass of 80° C., a temperature of the rolls of 145° C., a linear velocity of 10 m/min, a line width of 1.5 m, and a pressure of 0 to 200 kN/m.

In the second step, projections and recesses in a pattern of grooves each with a continuous bottom (shape of engraved lines) were formed by the following procedure. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass having a random pattern of projections and recesses transferred in the first step was passed through the device for transferring a pattern of projections and recesses, thereby forming projections and recesses in which recesses each having a groove shape with a continuous bottom (shape of an engraved line) were adjacent and parallel to each other at equal intervals on a first surface. The transferring conditions employed here were a temperature of the interlayer film for a laminated glass of 80° C., a temperature of the rolls of 140° C., a linear velocity of 10 m/min, a line width of 1.5 m, and a pressure of 0 to 500 kPa.

Then, the same operations were performed on a second surface of the interlayer film for a laminated glass to form recesses each having a groove shape with a continuous bottom (shape of an engraved line). At that time, the intersection angle θ between the recesses each having a groove shape with a continuous bottom on the first surface and the recesses each having a groove shape with a continuous bottom on the second surface was set to 90°.

(4) Analysis of Projections and Recesses on First Surface and Second Surface

The interval Sm and the roughness Rz of the recesses each having a groove shape with a continuous bottom on the first surface and the second surface of the obtained interlayer film for a laminated glass were measured by the methods in conformity with JIS B 0601 (1994). The measurement was performed in a direction perpendicular to the groove shape with a continuous bottom at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. Since the shape of the surface of the interlayer film for a laminated glass varies, the measurement was performed at five sites in the plane, and the average thereof was taken as the evaluation result.

The interlayer film for a laminated glass was cut with a single-edged razor (FAS-10 produced by FEATHER Safety Razor Co., Ltd.) in a direction perpendicular to the grooves each with a continuous bottom and in parallel with the thickness direction of the film in such a manner that the cut plane was not deformed. Specifically, the razor was not slid in the direction perpendicular to the recesses but pushed out in a direction parallel to the thickness direction. The cross section was observed using a microscope (e.g., "DSX-100" produced by Olympus Corporation). The cross section was photographed at a magnification of 277 times. The obtained image was enlarged to 50 μm/20 mm for analysis using the measurement software included in accessory software, and the radius of a circle inscribed at the bottom of the groove with a continuous bottom (i.e., radius of rotation R) was obtained. The measurement was performed at 23° C. and 30 RH %.

When a roughness curve is drawn in conformity with JIS B 0601 (1994) in a direction of a line representing the shortest distance between deepest bottoms of adjacent recesses each having a groove shape with a continuous bottom of the obtained interlayer film for a laminated glass, the highest point of the obtained roughness curve was at the center of the line representing the shortest distance between the deepest bottoms. In other words, the adjacent recesses each having a groove shape with a continuous bottom of the obtained interlayer film for a laminated glass were symmetric with respect to a line perpendicularly crossing the center of the line representing the shortest distance between deepest bottoms.

(5) Production of a Laminate

The obtained interlayer film for a laminated glass was sandwiched between two clear glass plates (30 cm in length×30 cm in width×2.5 mm in thickness) and the portions of the film protruding from the glass plates were cut off, thereby preparing a laminate. The resulting laminate was preliminarily heated to the glass surface temperature of 50° C. in an oven, and transferred into a rubber bag, which was then connected to a vacuum suction device. The rubber bag was heated so that the temperature of the laminate (preliminary pressure bonding temperature) reached 90° C., while being held under a reduced pressure of −600 mmHg for 10 minutes. Thereafter, the pressure was returned to atmospheric pressure, whereby the preliminary pressure bonding was completed.

Examples 7 to 14

An interlayer film for a laminated glass and a laminate were produced as in Example 6, except that the acetyl group content, butyral group content, and hydroxy group content of the polyvinyl butyral used, the amount of the plasticizer, and the amount of magnesium (Mg) were changed as shown in Table 2 and that the radius of rotation R, the interval Sm, the roughness Rz, and the intersection angle θ of the recesses each having a groove shape with a continuous bottom on the first surface and the second surface were changed as shown in Table 2 by changing the shape of the metal roll having a surface milled with a triangular oblique line-type mill.

When a roughness curve was drawn in conformity with JIS B 0601 (1994) in a direction of a line representing the shortest distance between deepest bottoms of adjacent recesses each having a groove shape with a continuous bottom of each of the obtained interlayer films for a laminated glass in Examples 7 to 11, the highest point of the obtained roughness curve was at the center of the line representing the shortest distance between the deepest bottoms. In other words, the adjacent recesses each having a groove shape with a continuous bottom of each of the obtained interlayer films for a laminated glass of Examples 7 to 11 were symmetric with respect to a line perpendicularly crossing the center of the line representing the shortest distance between the deepest bottoms.

In contrast, when a roughness curve was drawn in conformity with JIS B 0601 (1994) in a direction of a line representing the shortest distance between deepest bottoms of adjacent recesses each having a groove shape with a continuous bottom of each of the obtained interlayer films for a laminated glass of Examples 12 to 14, the highest point of the obtained roughness curve was not at the center of the line representing the shortest distance between the deepest bottoms. In other words, the adjacent recesses each having a groove shape with a continuous bottom of each of the obtained interlayer films for a laminated glass of Examples 12 to 14 were asymmetric with respect to a line perpendicularly crossing the center of the line representing the shortest distance between the deepest bottoms.

Example 15

(Preparation of a Resin Composition for Protective Layers)

Polyvinyl alcohol having an average degree of polymerization of 1700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral were added 36 parts by mass of triethylene glycol-di-2-ethylhexanoate (3GO) as a plasticizer. In addition, a mixture (mass ratio of 1:1) of magnesium 2-ethylbutyrate and magnesium acetate as an adhesion modifier was added thereto in such an amount that the magnesium content became 50 ppm. The mixture was kneaded well with a mixing roll to give a resin composition for protective layers.

(Preparation of a Resin Composition for Sound Insulation Layers)

Polyvinyl alcohol having an average degree of polymerization of 2300 was acetalized with n-butyraldehyde to give polyvinyl butyral (acetyl group content: 12.5 mol %, butyral group content: 64 mol %, hydroxy group content: 23.5 mol %). To 100 parts by mass of the polyvinyl butyral were added 76.5 parts by mass of triethylene glycol-di-2-ethylhexanoate (3GO) as a plasticizer, and the mixture was mixed well with a mixing roll to give a resin composition for sound insulation layers.

(Production of an Interlayer Film for a Laminated Glass)

The resin composition for sound insulation layers and the resin composition for protective layers were co-extruded to form an interlayer film for a laminated glass (width: 100 cm) having a triple layer structure including a first protective layer (thickness: 300 μm), a sound insulation layer (thickness: 100 μm), and a second protective layer (thickness: 400 μm) stacked in the stated order in the thickness direction.

(Formation of Projections and Recesses)

In the first step, a random pattern of projections and recesses was transferred to both surfaces of the interlayer film for a laminated glass by the following procedure. A pair of rolls in the same shape having a coarse main emboss pattern and a fine sub-emboss pattern was prepared by forming random projections and recesses on the surfaces of iron rolls with an abrasive material, performing vertical grinding thereon, and further forming finer projections and recesses on planar portions after the grinding with a finer abrasive material. Using the pair of rolls as a device for transferring a pattern of projections and recesses, a random pattern of projections and recesses was transferred to both surfaces of the obtained interlayer film for a laminated glass. The transferring conditions employed here were a temperature of the interlayer film for a laminated glass of 80° C., a temperature of the rolls of 145° C., a linear velocity of 10 m/min, a line width of 1.5 m, and a pressure of 0 to 200 kN/m.

In the second step, projections and recesses in a pattern of grooves each with a continuous bottom (shape of engraved lines) were formed by the following procedure. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass having a random pattern of projections and recesses transferred in the first step was passed through the device for transferring a pattern of projections and recesses, thereby forming projections and recesses in which recesses each having a groove shape with a continuous bottom (shape of an engraved line) were adjacent and parallel to each other at equal intervals on a first surface of the interlayer film for a laminated glass. The transferring conditions employed here were a temperature of the interlayer film for a laminated glass of 80° C., a temperature of the rolls of 140° C., a linear velocity of 10 m/min, a line width of 1.5 m, and a pressure of 0 to 500 kPa.

Then, the same operation was performed on a second surface of the interlayer film for a laminated glass to form recesses each having a groove shape with a continuous bottom (shape of engraved lines). At that time, the intersection angle θ between the recesses each having a groove shape with a continuous bottom on the first surface and the recesses each having a groove shape with a continuous bottom on the second surface was set to 20°.

The radius of rotation R, the interval Sm, and the roughness Rz of the recesses each having a groove shape with a continuous bottom on the first surface and the second surface were measured by the same methods as those in Example 1. When a roughness curve was drawn in conformity with JIS B 0601 (1994) in a direction of a line representing the shortest distance between deepest bottoms of adjacent recesses each having a groove shape with a continuous bottom of the obtained interlayer film for a laminated glass, the highest point of the obtained roughness curve was at the center of the line representing the shortest distance between the deepest bottoms. In other words, the adjacent recesses each having a groove shape with a continuous bottom of the obtained interlayer film for a laminated glass were symmetric with respect to a line perpendicularly crossing the center of the line representing the shortest distance between deepest bottoms.

(Production of a Laminate and a Laminated Glass)

The obtained interlayer film for a laminated glass was sandwiched between two clear glass plates (30 cm in length× 30 cm in width×2.5 mm in thickness) and the portions of the film protruding from the glass plates were cut off, thereby preparing a laminate. The resulting laminate was preliminarily heated to the glass surface temperature of 50° C. in an oven, and transferred into a rubber bag, which was then connected to a vacuum suction device. The rubber bag was heated so that the temperature of the laminate (preliminary pressure bonding temperature) reached 90° C., while being held under a reduced pressure of −600 mmHg for 10 minutes. Thereafter, the pressure was returned to atmospheric pressure, whereby the preliminary pressure bonding was completed.

The preliminarily pressure bonded laminate was placed in an autoclave, and held at a temperature of 140° C. and a pressure of 1300 kPa for 10 minutes. The temperature was lowered to 50° C. and the pressure was returned to atmospheric pressure, whereby the final pressure bonding was completed. A laminated glass was thus prepared.

(Measurement of Plasticizer Content)

The obtained laminated glass was allowed to stand at a temperature of 25° C. and a humidity of 30% for 4 weeks. Then, the laminated glass was cooled in liquid nitrogen to separate the glass from the interlayer film for a laminated glass. The resulting interlayer film for a laminated glass was cut in the thickness direction, and allowed to stand at a temperature of 25° C. and a humidity of 30% for 2 hours. The protective layer was peeled from the sound insulation layer using a finger or a device inserted between the protective layer and the sound insulation layer at a temperature of 25° C. and a humidity of 30%, thereby preparing 10 g of a rectangular sample for measurement of each of the protective layer and the sound insulation layer. The plasticizer in the sample for measurement was extracted in diethyl ether using a Soxhlet extractor for 12 hours, and the amount of the plasticizer in the sample for measurement was determined, thereby obtaining the plasticizer contents of the protective layer and the intermediate layer.

Examples 16 to 21, Comparative Examples 7 to 10

An interlayer film for a laminated glass, a laminate, and a laminated glass were produced as in Example 15, except that the acetyl group content, butyral group content, and hydroxy group content of the polyvinyl butyral used, the amount of the plasticizer, the amount of magnesium (Mg), the thickness of the first protective layer, and the thickness of the second protective layer were changed as shown in Table 3 and that the radius of rotation R, the interval Sm, the roughness Rz, and the intersection angle θ of the recesses each having a groove shape with a continuous bottom on the first surface and the second surface were changed as shown in Table 3 by changing the shape of the metal roll having a surface milled with a triangular oblique line-type mill.

When a roughness curve was drawn in conformity with JIS B 0601 (1994) in a direction of a line representing the shortest distance between deepest bottoms of adjacent recesses each having a groove shape with a continuous bottom of each of the obtained interlayer films for a laminated glass in Examples 16 to 21, the highest point of the obtained roughness curve was at the center of the line representing the shortest distance between the deepest bottoms. In other words, the adjacent recesses each having a groove shape with a continuous bottom of each of the obtained interlayer films for a laminated glass of Examples 16 to 21 were symmetric with respect to a line perpendicularly crossing the center of the line representing the shortest distance between the deepest bottoms.

(Evaluation)

In relation to the interlayer film for a laminated glass and the laminated glass of each of the examples and comparative examples, the parallel light transmittance of the laminate after the preliminary pressure bonding was evaluated by the following method.

Specifically, the parallel light transmittance Tp (%) of the laminate after the preliminary pressure bonding in production of the laminated glass was measured with a haze meter (HM-150 produced by Murakami Color Research Laboratory) in conformity with JIS K 7105.

The parallel light transmittance was measured at five measurement points in total including the intersection of two diagonals of the laminate and 4 points at 10 cm away from the apexes of the laminate in the diagonal direction, and the average of the measured values was taken as the Tp.

Before the measurement, the laminate was cut to give pieces each with a size of 5 cm×5 cm including any of the above measurement points at the center, and the pieces were used as samples for measurement.

Reduction in transparency of the laminated glass is caused by defective deaeration during preliminary pressure bonding. Accordingly, the deaeration properties of the interlayer film for a laminated glass can be evaluated more precisely by measurement of the parallel light transmittance of the laminate after the preliminary pressure bonding than analysis of foaming in the resulting laminated glass.

Tables 1, 2, and 3 show the results.

Interlayer films for a laminated glass and laminates were produced as in Examples 1 to 5 and Comparative Examples 1 to 6, except that the intersection angle between the recesses each having a groove shape with a continuous bottom on the first surface and the recesses each having a groove shape with a continuous bottom on the second surface was set to 20°, and they had the same deaeration properties as those of Examples 1 to 5 and Comparative Examples 1 to 6.

TABLE 1

| | | Example 1 | Example 2 | Example 3 | Example 4 | Example 5 | Comparative Example 1 |
|---|---|---|---|---|---|---|---|
| Composition | Butyral group content (mol %) | 69 | 69 | 69 | 69 | 69 | 69 |
| | Hydroxy group content (mol %) | 30 | 30 | 30 | 30 | 30 | 30 |
| | Acetyl group content (mol %) | 1 | 1 | 1 | 1 | 1 | 1 |
| | Parts of plasticizer (phr) | 40 | 40 | 40 | 40 | 40 | 40 |
| First surface | Radius of rotation R of recess (μm) | 8 | 63 | 12 | 40 | 25 | 330 |
| | Interval Sm (μm) | 189 | 300 | 300 | 195 | 200 | 290 |
| | Roughness Rz (μm) | 44 | 42 | 42 | 41 | 42 | 34 |
| Second surface | Radius of rotation R of recess (μm) | 8 | 9 | 10 | 30 | 30 | 220 |
| | Interval Sm (μm) | 200 | 399 | 298 | 190 | 195 | 400 |
| | Roughness Rz (μm) | 43 | 48 | 42 | 47 | 42 | 33 |
| Evaluation | Parallel light transmittance of laminate after preliminary pressure bonding (%) | 78 | 65 | 72 | 55 | 60 | 26 |

| | | Comparative Example 2 | Comparative Example 3 | Comparative Example 4 | Comparative Example 5 | Comparative Example 6 |
|---|---|---|---|---|---|---|
| Composition | Butyral group content (mol %) | 69 | 69 | 69 | 69 | 69 |
| | Hydroxy group content (mol %) | 30 | 30 | 30 | 30 | 30 |
| | Acetyl group content (mol %) | 1 | 1 | 1 | 1 | 1 |
| | Parts of plasticizer (phr) | 40 | 40 | 40 | 40 | 40 |
| First surface | Radius of rotation R of recess (μm) | 256 | 280 | 47 | 65 | 85 |
| | Interval Sm (μm) | 400 | 290 | 203 | 200 | 203 |
| | Roughness Rz (μm) | 44 | 35 | 34 | 47 | 33 |
| Second surface | Radius of rotation R of recess (μm) | 230 | 330 | 53 | 59 | 70 |
| | Interval Sm (μm) | 300 | 285 | 198 | 195 | 198 |
| | Roughness Rz (μm) | 46 | 30 | 31 | 53 | 33 |
| Evaluation | Parallel light transmittance of laminate after preliminary pressure bonding (%) | 45 | 23 | 45 | 49 | 33 |

TABLE 2

|  |  | Example 6 | Example 7 | Example 8 | Example 9 | Example 10 |
|---|---|---|---|---|---|---|
| Composition | Butyral group content (mol %) | 69 | 69 | 69 | 69 | 69.9 |
|  | Hydroxy group content (mol %) | 30 | 30 | 30 | 30 | 29 |
|  | Acetyl group content (mol %) | 1 | 1 | 1 | 1 | 1.1 |
|  | Parts of plasticizer (phr) | 40 | 40 | 40 | 40 | 41 |
|  | Mg content (ppm) | 50 | 20 | 50 | 50 | 50 |
| First surface | Radius of rotation R of recess (μm) | 10 | 10 | 20 | 22 | 25 |
|  | Interval Sm (μm) | 160 | 398 | 300 | 185 | 200 |
|  | Roughness Rz (μm) | 30 | 45 | 35 | 33 | 42 |
|  | Symmetry of shape | Symmetric | Symmetric | Symmetric | Symmetric | Symmetric |
| Second surface | Radius of rotation R of recess (μm) | 10 | 11 | 20 | 25 | 30 |
|  | Interval Sm (μm) | 143 | 385 | 290 | 178 | 195 |
|  | Roughness Rz (μm) | 32 | 44 | 33 | 34 | 42 |
|  | Symmetry of shape | Symmetric | Symmetric | Symmetric | Symmetric | Symmetric |
| Intersection angle θ (°) |  | 90 | 70 | 20 | 10 | 40 |
| Evaluation | Parallel light transmittance of laminate after preliminary pressure bonding (%) | 79 | 55 | 60 | 67 | 58 |

|  |  | Example 11 | Example 12 | Example 13 | Example 14 |
|---|---|---|---|---|---|
| Composition | Butyral group content (mol %) | 68.2 | 69 | 69 | 69 |
|  | Hydroxy group content (mol %) | 31 | 30 | 30 | 30 |
|  | Acetyl group content (mol %) | 0.8 | 1 | 1 | 1 |
|  | Parts of plasticizer (phr) | 39 | 40 | 40 | 40 |
|  | Mg content (ppm) | 100 | 50 | 50 | 50 |
| First surface | Radius of rotation R of recess (μm) | 18 | 6 | 15 | 10 |
|  | Interval Sm (μm) | 202 | 200 | 175 | 300 |
|  | Roughness Rz (μm) | 40 | 35 | 30 | 29 |
|  | Symmetry of shape | Symmetric | Asymmetric | Asymmetric | Asymmetric |
| Second surface | Radius of rotation R of recess (μm) | 20 | 6 | 13 | 10 |
|  | Interval Sm (μm) | 198 | 198 | 169 | 292 |
|  | Roughness Rz (μm) | 40 | 38 | 33 | 30 |
|  | Symmetry of shape | Symmetric | Asymmetric | Asymmetric | Asymmetric |
| Intersection angle θ (°) |  | 20 | 20 | 20 | 20 |
| Evaluation | Parallel light transmittance of laminate after preliminary pressure bonding (%) | 68 | 77 | 78 | 65 |

TABLE 3

|  |  | Example 15 | Example 16 | Example 17 | Example 18 | Example 19 | Example 20 |
|---|---|---|---|---|---|---|---|
| First protective layer | Butyral group content (mol %) | 69 | 69 | 68.5 | 69.9 | 68.5 | 69.9 |
|  | Hydroxy group content (mol %) | 30 | 30 | 31 | 29 | 31 | 29 |
|  | Acetyl group content (mol %) | 1 | 1 | 0.5 | 1.1 | 0.5 | 1.1 |
|  | Parts of plasticizer (phr) | 36 | 36 | 36 | 39 | 36 | 39 |
|  | Mg content (ppm) | 50 | 100 | 10 | 50 | 50 | 50 |
|  | Thickness (μm) | 300 | 250 | 300 | 300 | 300 | 300 |
| Sound insulation layer | Butyral group content (mol %) | 64 | 64 | 67 | 77.8 | 67 | 77.8 |
|  | Hydroxy group content (mol %) | 23.5 | 23.5 | 25 | 20.7 | 25 | 20.7 |
|  | Acetyl group content (mol %) | 12.5 | 12.5 | 8 | 1.5 | 8 | 1.5 |
|  | Parts of plasticizer (phr) | 76.5 | 76.5 | 75 | 79.3 | 75 | 79.2 |
|  | Thickness (μm) | 100 | 100 | 100 | 100 | 100 | 100 |
| Second protective layer | Butyral group content (mol %) | 69 | 69 | 68.5 | 69.9 | 68.5 | 69.9 |
|  | Hydroxy group content (mol %) | 30 | 30 | 31 | 29 | 31 | 29 |
|  | Acetyl group content (mol %) | 1 | 1 | 0.5 | 1.1 | 0.5 | 1.1 |
|  | Parts of plasticizer (phr) | 36 | 36 | 36 | 39 | 36 | 39 |
|  | Mg content (ppm) | 50 | 100 | 10 | 50 | 50 | 50 |
|  | Thickness (μm) | 400 | 450 | 400 | 400 | 400 | 400 |
| First surface | Radius of rotation R of recess (μm) | 8 | 12 | 10 | 8 | 10 | 12 |
|  | Interval Sm (μm) | 189 | 300 | 190 | 201 | 300 | 305 |
|  | Roughness Rz (μm) | 44 | 42 | 43 | 45 | 45 | 45 |
|  | Symmetry of shape | Symmetric | Symmetric | Symmetric | Symmetric | Symmetric | Symmetric |
| Second surface | Radius of rotation R of recess (μm) | 8 | 10 | 8 | 9 | 9 | 10 |
|  | Interval Sm (μm) | 200 | 298 | 202 | 187 | 295 | 300 |
|  | Roughness Rz (μm) | 43 | 42 | 40 | 46 | 43 | 45 |
|  | Symmetry of shape | Symmetric | Symmetric | Symmetric | Symmetric | Symmetric | Symmetric |
| Intersection angle θ (°) |  | 20 | 90 | 70 | 90 | 10 | 20 |
| Evaluation | Parallel light transmittance of laminate after preliminary pressure bonding (%) | 76 | 72 | 77 | 80 | 70 | 73 |

TABLE 3-continued

|  |  | Example 21 | Comparative Example 7 | Comparative Example 8 | Comparative Example 9 | Comparative Example 10 |
|---|---|---|---|---|---|---|
| First protective layer | Butyral group content (mol %) | 69 | 69 | 69 | 69 | 69 |
|  | Hydroxy group content (mol %) | 30 | 30 | 30 | 30 | 30 |
|  | Acetyl group content (mol %) | 1 | 1 | 1 | 1 | 1 |
|  | Parts of plasticizer (phr) | 40 | 36 | 36 | 36 | 36 |
|  | Mg content (ppm) | 50 | 50 | 50 | 50 | 50 |
|  | Thickness (μm) | 250 | 300 | 300 | 300 | 300 |
| Sound insulation layer | Butyral group content (mol %) | 64 | 64 | 64 | 64 | 64 |
|  | Hydroxy group content (mol %) | 23.5 | 23.5 | 23.5 | 23.5 | 23.5 |
|  | Acetyl group content (mol %) | 12.5 | 12.5 | 12.5 | 12.5 | 12.5 |
|  | Parts of plasticizer (phr) | 76.5 | 76.5 | 76.5 | 76.5 | 76.5 |
|  | Thickness (μm) | 100 | 100 | 100 | 100 | 100 |
| Second protective layer | Butyral group content (mol %) | 69 | 69 | 69 | 69 | 69 |
|  | Hydroxy group content (mol %) | 30 | 30 | 30 | 30 | 30 |
|  | Acetyl group content (mol %) | 1 | 1 | 1 | 1 | 1 |
|  | Parts of plasticizer (phr) | 40 | 36 | 36 | 36 | 36 |
|  | Mg content (ppm) | 50 | 50 | 50 | 50 | 50 |
|  | Thickness (μm) | 450 | 400 | 400 | 400 | 400 |
| First surface | Radius of rotation R of recess (μm) | 30 | 300 | 300 | 50 | 100 |
|  | Interval Sm (μm) | 195 | 290 | 290 | 200 | 205 |
|  | Roughness Rz (μm) | 42 | 30 | 33 | 34 | 30 |
|  | Symmetry of shape | Symmetric | Symmetric | Symmetric | Symmetric | Symmetric |
| Second surface | Radius of rotation R of recess (μm) | 25 | 200 | 340 | 55 | 80 |
|  | Interval Sm (μm) | 190 | 400 | 285 | 196 | 200 |
|  | Roughness Rz (μm) | 45 | 30 | 33 | 33 | 31 |
|  | Symmetry of shape | Symmetric | Symmetric | Symmetric | Symmetric | Symmetric |
| Intersection angle θ (°) |  | 20 | 20 | 20 | 20 | 20 |
| Evaluation | Parallel light transmittance of laminate after preliminary pressure bonding (%) | 60 | 24 | 20 | 43 | 30 |

INDUSTRIAL APPLICABILITY

The present invention can provide an interlayer film for a laminated glass capable of exhibiting high deaeration properties in a vacuum deaeration method and enabling production of highly transparent laminated glass, and a laminated glass including the interlayer film for a laminated glass.

REFERENCE SIGNS LIST

1: One arbitrarily selected recess
2: Recess adjacent to the arbitrarily selected recess
3: Recess adjacent to the arbitrarily selected recess
A: Interval between recess 1 and recess 2
B: Interval between recess 1 and recess 3
20: Surface of interlayer film for a laminated glass
21: Recess having a groove shape with a continuous bottom
22: Projection
30: Surface of interlayer film for a laminated glass
31: Recess having a groove shape with a continuous bottom
32: Projection
33: Line representing the shortest distance between deepest bottoms of adjacent recesses each having a groove shape with a continuous bottom
34: Line perpendicularly crossing the center of the line representing the shortest distance between deepest bottoms of adjacent recesses each having a groove shape with a continuous bottom

The invention claimed is:

1. An interlayer film for a laminated glass, having recesses on at least one surface,
the recesses each having a groove shape with a continuous bottom and being adjacently and regularly arranged in parallel with each other,
the recesses each having a radius of rotation R of a bottom of the groove shape with a continuous bottom of 45 μm or less,
wherein each highest point determined from a roughness curve drawn in conformity with JIS B 0601 (1994) in a direction of a line representing the shortest distance between deepest bottoms of adjacent recesses each having a groove shape with a continuous bottom is not at the center of the line representing the shortest distance between the deepest bottoms, and
roughness Rz of the recesses each having a groove shape with a continuous bottom is 20 μm or more.

2. The interlayer film for a laminated glass according to claim 1,
wherein the recesses each have a radius of rotation R of the bottom of the groove shape with a continuous bottom of 0.1 μm or more and 45 μm or less.

3. The interlayer film for a laminated glass according to claim 1,
wherein an interval Sm between the recesses each having a groove shape with a continuous bottom is 400 μm or less.

4. The interlayer film for a laminated glass according to claim 1,
wherein roughness Rz of the recesses each having a groove shape with a continuous bottom is 60 μm or less.

5. The interlayer film for a laminated glass according to claim 1,
wherein the surface having recesses further has projections, and
the projections each have a non-planar apex.

6. The interlayer film for a laminated glass according to claim 1,
wherein the interlayer film for a laminated glass contains at least one metal selected from the group consisting of alkali metals, alkaline earth metals, and magnesium, and
the amount of the at least one metal selected from the group consisting of alkali metals, alkaline earth metals, and magnesium is 1 ppm or more and 500 ppm or less.

7. The interlayer film for a laminated glass according to claim 1, wherein the interlayer film for a laminated glass has recesses on both one surface and an other surface opposite to the one surface, the recesses each have a groove shape with a continuous bottom, and the recesses each having a groove shape with a continuous bottom on the one surface and the recesses each having a groove shape with a continuous bottom on the other surface form an intersection angle θ of more than 0°.

8. The interlayer film for a laminated glass according to claim 1, wherein the interlayer film for a laminated glass has a laminated structure including a first resin layer, a second resin layer, and a third resin layer stacked in said order in a thickness direction, and the first resin layer and the third resin layer have different thicknesses.

9. A laminated glass including:

a pair of glass plates; and the interlayer film for a laminated glass according to claim 1 interposed between the pair of glass plates.

10. The interlayer film for a laminated glass according to claim 1, wherein the radius of rotation R of the bottom of the groove shape with a continuous bottom is measured by the following method:

creating a cross section by cutting the interlayer film in a direction perpendicular to the groove shape with a continuous bottom and in parallel with a thickness direction of the interlayer film, wherein a cut plane resulting from the cutting is not deformed, photographing the cross section at a magnification of 277 times to obtain an image, enlarging the obtained image to 50 μm/20 mm to obtain an enlarged image, inscribing a circle at the bottom of the groove shape with a continuous bottom in the enlarged image, and determining the radius of the inscribed circle, wherein the radius of the inscribed circle at the bottom of the groove shape with a continuous bottom is the radius of rotation R.

* * * * *